United States Patent
Laroia et al.

(10) Patent No.: US 7,502,623 B2
(45) Date of Patent: Mar. 10, 2009

(54) APPARATUS AND METHOD FOR USE IN IDENTIFYING PRESENCE OF WIRELESS TERMINALS IN MOBILE WIRELESS COMMUNICATIONS SYSTEMS

(75) Inventors: Rajiv Laroia, Basking Ridge, NJ (US); Junyi Li, Matawan, NJ (US); Sathyadev Venkata Uppala, Scotch Plains, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 209 days.

(21) Appl. No.: 11/199,402

(22) Filed: Aug. 8, 2005

(65) Prior Publication Data
US 2005/0272453 A1 Dec. 8, 2005

(51) Int. Cl.
*H04B 7/00* (2006.01)
(52) U.S. Cl. .................. 455/515; 455/522; 455/421; 455/426; 455/317; 455/517; 370/333; 370/377; 370/347
(58) Field of Classification Search .................. 455/515, 455/421, 426, 512; 370/342, 333, 330, 322, 370/345
See application file for complete search history.

(56) References Cited

U.S. PATENT DOCUMENTS

| | | | | |
|---|---|---|---|---|
| 5,485,463 A | * | 1/1996 | Godoroja | 370/333 |
| 5,828,662 A | * | 10/1998 | Jalali et al. | 370/335 |
| 6,330,234 B1 | * | 12/2001 | Tomasi et al. | 370/342 |
| 6,504,834 B1 | * | 1/2003 | Fifield | 370/345 |
| 6,587,444 B1 | * | 7/2003 | Lenzo et al. | 370/330 |

FOREIGN PATENT DOCUMENTS

| | | |
|---|---|---|
| JP | 6311094 | 11/1994 |
| JP | 2001024573 | 1/2001 |
| JP | 2001036977 | 2/2001 |

* cited by examiner

*Primary Examiner*—David Q. Nguyen

(57) ABSTRACT

An unique arrangement including a so-called timing control order and timing control signals is employed to identify whether wireless terminals are reachable within a base station cell coverage area in a wireless communications system. To this end, detection of a particular wireless terminal being alive and well, and within the cell coverage area associated with a base station is effected by the base station transmitting a timing control order in a timing control time slot reserved for the particular wireless terminal. If the particular wireless terminal receives the timing control order, it transmits a prescribed timing control message at a prescribed time. If the base station does not receive the timing control message, it is an indication that communication with the particular wireless terminal has been lost.

17 Claims, 4 Drawing Sheets

BASE STATION

WIRELESS TERMINAL

APPARATUS AND METHOD FOR USE IN IDENTIFYING PRESENCE OF WIRELESS TERMINALS IN MOBILE WIRELESS COMMUNICATIONS SYSTEMS

RELATED APPLICATIONS

U.S. patent application Ser. No. 09/756,066, now issued as U.S. Pat. No. 6,816,736, and Ser. No. 09/756,384, now issued as U.S. Pat. No. 6,823,191, were filed concurrently herewith.

1. Technical Field

This invention relates to wireless communications systems and, more particularly, to wireless communications between mobile wireless terminals and base stations.

2. Background of the Invention

In mobile wireless communications systems base stations and one or more wireless terminals communicate with each other. Typically, a base station is associated with a so-called cell and communicates with one or more wireless terminals within the area of the cell. In so doing, it is necessary for the base station to identify wireless terminals within its associated cell. Indeed, the wireless terminals may move from one cell to another. This movement may occur without a particular wireless terminal informing the base station associated with a cell that it has left the cell coverage area. Moreover, any particular wireless terminal may have run out of power or has moved into a so-called coverage hole within a cell and, therefore, may not be able to communicate with the current base station associated with the cell. Since, the base station has devoted some system resource, for example, bandwidth and/or state variables, to communicate with each wireless terminal, the unexplained loss of communication with the wireless terminal implies that the system resource is being unnecessarily used, i.e., wasted. Thus, it is in the best interest of overall system efficiency to recover use of the wasted resource. One way of doing this is to determine if the particular wireless terminal can communicate with the base station. An attempt at realizing this determination is for the base station to transmit a paging message intended for the particular wireless terminal. If the wireless terminal receives the paging message, it transmits a paging response message back to the base station. Lack of such a response message being received by the base station indicates that communication with the wireless terminal has been lost. In known wireless communications systems, this interaction between the base station and wireless terminals involves setting up communications links between the base station and wireless terminals through a random access process. Unfortunately, this process can turn out to be quite costly in terms of system resource utilization.

SUMMARY OF THE INVENTION

These and other problems and limitations of prior mobile wireless communications systems are overcome by applicants' unique use of a so-called timing control order. To this end, detection of a particular wireless terminal being alive and well, and within the cell coverage area associated with a base station is effected by the base station transmitting a timing control order in a timing control time slot reserved for the particular wireless terminal. If the particular wireless terminal receives the timing control order, it transmits a prescribed timing control message at a prescribed time. If the base station does not receive the timing control message, it is an indication that communication with the particular wireless terminal has been lost.

Specifically, the prescribed timing control signal is dedicated for use by an intended wireless terminal and it is ensured that no two wireless terminals are ordered to transmit the same timing control signal at the same time. Consequently, there is no possibility of any collision between timing control signals transmitted from more than one wireless terminal.

In one embodiment of the invention, the prescribed time and prescribed timing control signal are specified in a paging message intended for the particular wireless terminal.

In another embodiment of the invention, the prescribed time and prescribed timing control signal are defined as part of the mobile wireless system parameters and are known to both the base station and wireless terminal.

DETAILED DESCRIPTION

Figure 1:
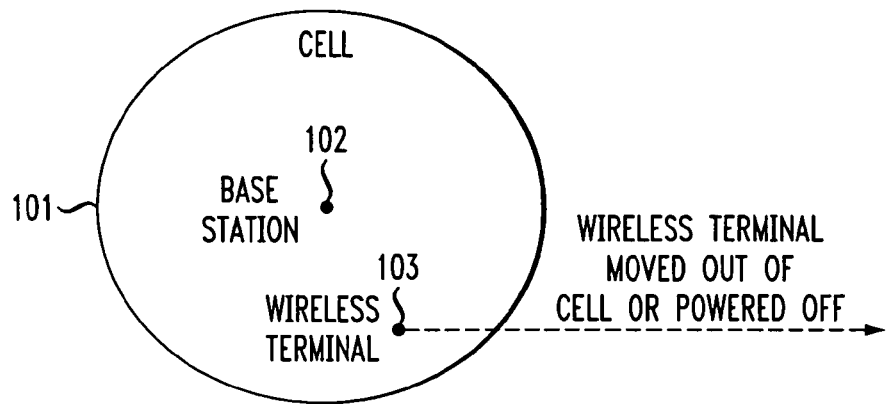
FIG. 1 shows, in simplified form, details of a wireless communications system cell area including a base station and at least one wireless terminal useful in describing the invention.

FIG. 1 shows, in simplified form, details of a wireless communications system cell area 101 including a base station 102 and at least one wireless terminal 103 useful in describing the invention. As shown, wireless terminal 103 originally is within the cell coverage area 101 of base station 102 and either leaves the cell area 101, powers off, enters a coverage "hole" or its battery power is lost. If any of these events occur, it is important that base station 102 be made aware that wireless terminal is no longer communicating within cell coverage area 101. Otherwise, system resources are needlessly used causing inefficient use of system resources.

Figure 2:
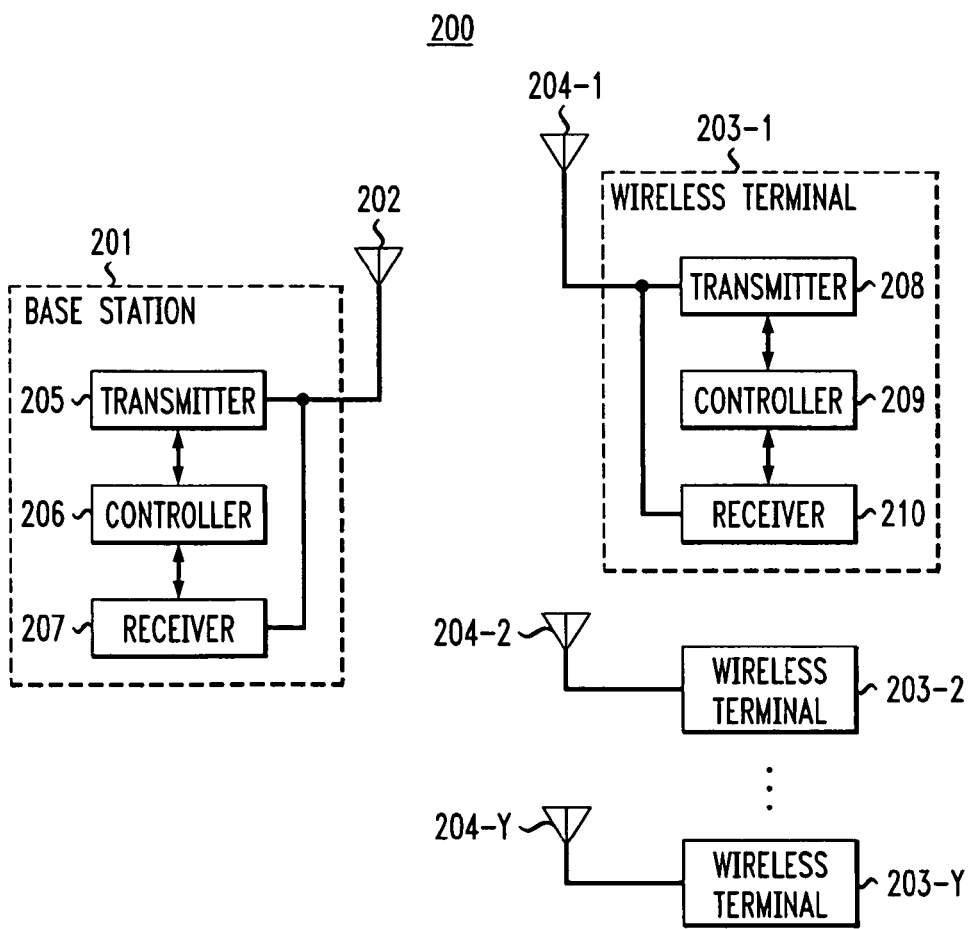
FIG. 2 shows, in simplified block diagram form, details of a base station and a plurality of mobile units in which the invention may be employed.

FIG. 2 shows, in simplified block diagram form, a wireless multiple access communications system in which the invention may be advantageously employed. It should be noted that although applicants' unique invention will be described in the context of a mobile wireless communications system, it has equal application to non-mobile, e.g. fixed, wireless communications systems. One such mobile wireless communications system is the Orthogonal Frequency Division Multiplexed (OFDM) based spread spectrum multiple access system.

Specifically, shown in FIG. 2 is a multiple access wireless communications system 200. System 200 includes base station 201 including antenna 202 and one or more remote wireless terminals, i.e., wireless terminals 203-1, 203-2 through 203-Y including associated antennas 204-1, 204-2 and 204-Y, respectively. Transmission of signals is from and to base station 201, to and from remote wireless terminals 203. All of wireless terminals 203 share the transmission spectrum in a dynamic fashion.

In this example, base station 201 includes transmitter 205, receiver 207 and controller 206 for transmitting and receiving wireless messages via antenna 202. Controller 206 is employed to control operation of transmitter 205 and receiver 207, in accordance with the invention. Similarly, in this example, each of wireless terminals 203-1 through 203-Y includes transmitter 208, receiver 210 and controller 209 for transmitting and receiving wireless messages via antenna 204. Controller 209 is employed to control operation of transmitter 208 and receiver 210, in accordance with the invention.

In accordance with the invention, base station 201 generates and transmits timing control orders and when appropriate terminate orders in paging time slots to wireless terminals 203. Typically, wireless terminals 203 when not in use are in a standby mode commonly referred to as a "sleep" mode. In the sleep mode most of the circuitry in the wireless terminal 203 is turned off in order to conserve energy and, thereby, extend battery life. In order for each of the wireless terminals 203 to detect whether there is a paging message intended for it, the particular wireless terminal 203 must come out of the sleep mode, i.e., wake up, and monitor incoming time slots for an associated timing control order or when appropriate a terminate order. Details of base station 201 processes and wireless terminal 203 processes in generating and utilizing timing control orders, timing signals and terminate orders are described below in relationship to FIGS. 4-7.

Figure 3:
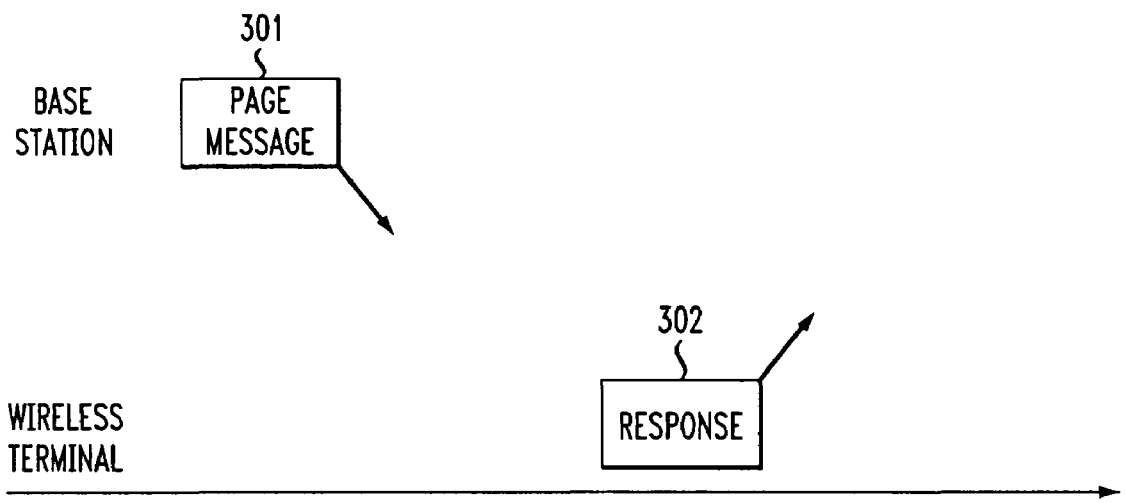
FIG. 3 graphically illustrates the prior use of a paging message and a response message for identifying whether a wireless terminal is currently in a base station's cell coverage area.

FIG. 3 graphically illustrates the prior use of a paging message and a response message for identifying whether a wireless terminal is currently in a base station's cell coverage area. In prior known arrangements a paging message 301 is sent in a paging time slot that a wireless terminal 203 supposedly monitors. Upon detecting the paging message, wireless terminal 203 normally would send back a response message to base station 201. Typically, base station 201 would determine whether wireless terminal 203 is in the cell coverage area associated with base station 201 based on whether the response message is received during a prescribed time interval. In known systems, wireless terminal 203 sends back the response message through a random access channel. In such an arrangement, there is potential for collisions with other random access messages, excessive use of the wireless terminal battery power and generation of interference to the other wireless terminals in the cell. Moreover, as the number of wireless terminals being monitored increases, the random access channel tends to be overloaded and generation of interference increases.

Figure 4:
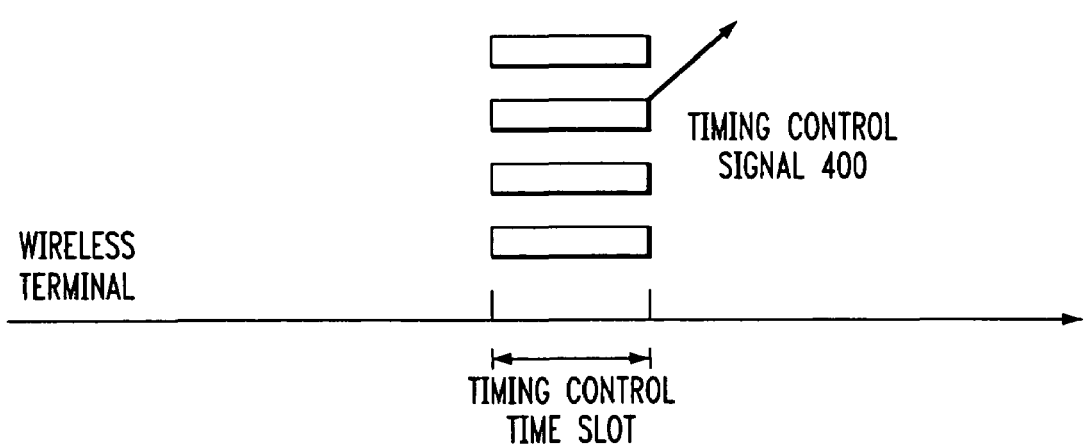
FIG. 4 graphically illustrates timing control signals used by wireless terminals in practicing the invention.

FIG. 4 graphically illustrates timing control signals used by wireless terminals in practicing the invention. Shown are timing control signals 400 which are orthogonal to each other and to the normal data channels. Each of the timing control signals 400 are formed with prescribed waveforms that have minimal resource overhead and are easy to detect at base station 201. A particular timing control signal is identified by a waveform number and a specific time at which it is transmitted. Generation and use of such timing control signals are described in U.S. patent applications Ser. No. 09/503,040, filed Feb. 11, 2000 and now issued as U.S. Pat. No. 6,967,936, and Ser. No. 09/503,041, filed Feb. 11, 2000 and now issued as U.S. Pat. No. 6,922,388, both of which are assigned to the assignee of this application. Specifically, wireless terminals 203 transmit certain pre-specified, wideband timing control signals in designated timing intervals. Typically, the timing control signal intervals occur regularly within an uplink data stream. All uplink data transmission is suspended during the timing control signal intervals.

Figure 5:
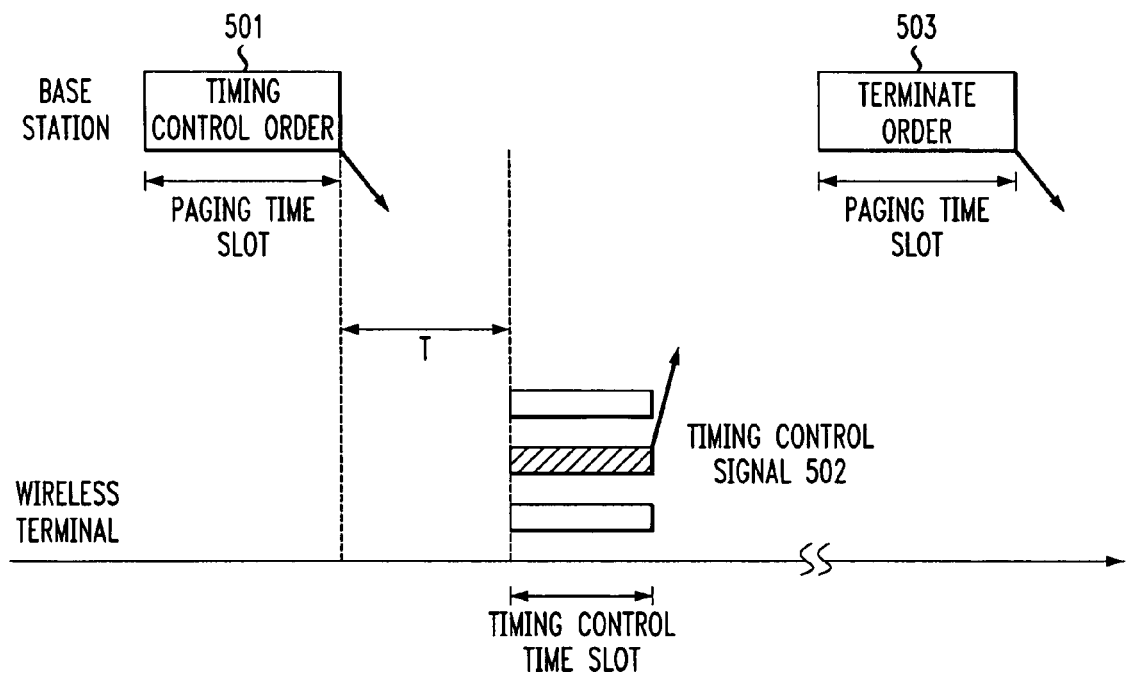
FIG. 5 graphically illustrates the use of a timing control order, a timing control signal and a terminate order in the operation of an embodiment of the invention.

FIG. 5 graphically illustrates the use of a timing control order, a timing control signal and a terminate order in the operation of an embodiment of the invention. As shown, base station 201 transmits a timing control order 501 in a prescribed paging time slot. The timing control order 501 is transmitted on demand, as desired. In this example, the timing control order includes a simple message identifying which wireless terminal 203 that it is intended for. It is again noted that the base station 201 is attempting to identify whether the particular wireless terminal 203 is still within its cell coverage area so that wireless resources may be efficiently marshaled. As noted above, the particular wireless terminal 203 may have left the cell coverage area, moved into a so-called coverage hole in the cell or has lost power, i.e., has a "dead" battery. Upon receiving the timing control order 501, the addressed wireless terminal 203 transmits back to base station 201 a prescribed timing control signal 502 at a prescribed time interval. The specifics of the prescribed timing control signal 502 and the prescribed time interval that it is transmitted in can be specified in the timing control order or may be defined as part of the wireless system parameters that are known a priori to both base station 201 and wireless terminals 203.

The system is controlled to ensure that no two or more wireless terminals 203 are ordered to transmit the same timing control signal during the same time interval. Consequently, there is no possibility of any collisions between timing control signals from different wireless terminals 203. Indeed, the resource for transmitting timing control signals has been dedicated for use only by the intended particular wireless terminal 203. Base station 201 then determines whether the particular wireless terminal 203 is reachable, i.e., in the cell coverage area and able to communicate with the associated base station 201, within the cell coverage area by detecting, or not, the prescribed timing control signal 502 in the prescribed time interval. The detection process may be repeated several times in attempting to determine whether the particular wireless terminal 203 is still within the base station 201 cell coverage area. If it is determined that the particular wireless terminal 203 is no longer reachable within the base station 201 cell coverage area, the base station 201 performs appropriate house keeping regarding resource and mobility management and, then transmits a terminate order 503 to the particular wireless terminal 203. The terminate order 503 ensures state consistency.

Figure 6:
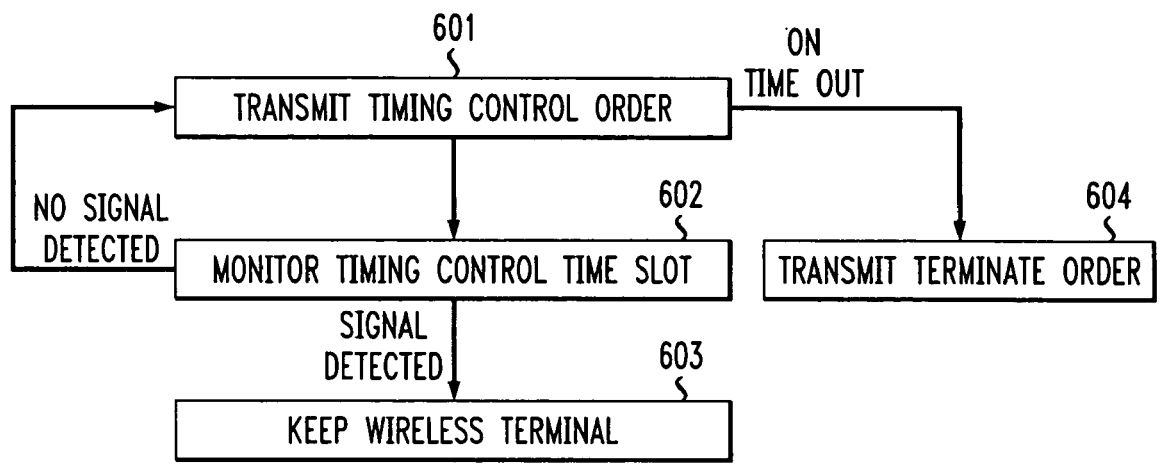
FIG. 6 is a flow chart illustrating the steps in a process of a base station employing the timing control order, timing control signal and terminate order in practicing one embodiment of the invention.

FIG. 6 is a flow chart illustrating the steps in a process of a base station 201 employing the timing control order 501, timing control signal 502 and terminate order 503 in practicing one embodiment of the invention. As shown, base station 201 in step 601 transmits a timing control order 501 to a particular wireless terminal 203. In step 602 base station 201 monitors the prescribed timing control time slot assigned to the wireless terminal 203. If step 602 detects a timing control signal 502 from the particular wireless terminal 203 step 603 maintains the status quo, i.e., the base station 201 keeps the wireless terminal 203 as being in its cell coverage area. If base station 201 does not detect a timing control signal 502 from the particular wireless terminal 203, control is returned to step 601 and steps 601 and 602 are repeated a prescribed number of times until a timing control signal 502 is detected or until a timer times out. Upon time out, base station 201 transmits a terminate order 503 to the particular wireless terminal 203 and performs its house keeping regarding system resources.

Figure 7:
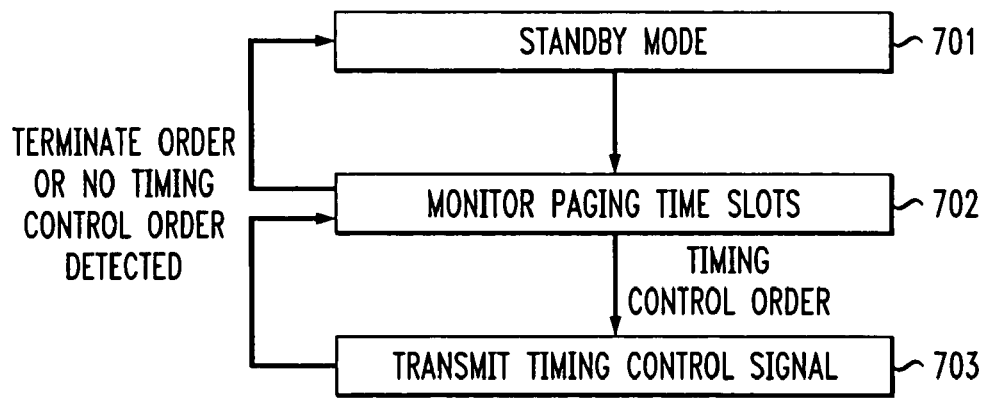
FIG. 7 is a flow chart illustrating the steps in the process of a wireless terminal utilizing the timing control order, timing control signal and terminate in practicing one embodiment of the invention.

FIG. 7 is a flow chart illustrating the steps in the process of a wireless terminal 203 utilizing the timing control order 501, timing control signal 502 and terminate order 503 in practicing one embodiment of the invention. Initially, wireless terminal 203 is in a standby, i.e., sleep, mode as indicated in step 701. In step 702, wireless terminal 203 wakes up to monitor its assigned paging time slot for messages. In this example, the messages include timing control order 501 and terminate order 503. Step 702 whether a terminate order 503 or a timing control order has been received by the wireless terminal 203. Note that wireless terminal returns to the standby mode in step 701 upon receiving a terminate order 503. If step 702 detects a timing control order 501 intended for this wireless terminal 203, step 703 causes a timing control signal to be transmitted to base station 201 having its prescribed waveform and in its prescribed time interval. Thereafter, control is returned to step 702.

The above-described embodiments are, of course, merely illustrative of the principles of the invention. Indeed, numerous other methods or apparatus may be devised by those skilled in the art without departing from the spirit and scope of the invention. Moreover, the invention may be implemented as hardware, as an integrated circuit, via programming on a microprocessor, on a digital signal processor or the like.

What is claimed is:

1. A method for use in a wireless communications system including at least one base station and one or more wireless terminals for identifying whether a particular wireless terminal is reachable within a base station cell coverage area, the method being performed in a base station and comprising the steps of:
    transmitting a timing control order in a timing control time slot assigned to said particular wireless terminal; and
    monitoring received timing control signal time slots to determine whether a timing control signal has been received from said particular wireless terminal, reception of said timing control signal indicating that said particular wireless terminal is reachable in said base station cell coverage area;
    wherein one or more parameters associated with transmission of the timing control signal by the particular wireless terminal are specified in the timing control order.

2. The method as defined in claim 1 wherein said timing control time slot is a paging time slot.

3. The method as defined in claim 1 wherein said timing control order includes the identity of said particular wireless terminal being queried.

4. The method as defined in claim 3 wherein said timing control order further includes a prescribed time at which and a prescribed timing control signal that said wireless terminal is to transmit.

5. The method as defined in claim 1 wherein said particular wireless terminal and said base station know a priori a prescribed timing control signal and a prescribed time that said prescribed timing control signal is to be transmitted by said particular wireless terminal.

6. The method as defined in claim 1 further including steps of determining whether said timing control message has been received in a prescribed interval and, if not, terminating any link connection assigned to said particular wireless terminal.

7. The method as defined in claim 6 wherein said step of terminating includes a step of transmitting a termination order to said particular wireless terminal.

8. The method as defined in claim 1 further including a step of transmitting said timing control order a prescribed number of times, if no timing control signal is received by said base station after said prescribed number of transmissions, terminating any link connection to said particular wireless terminal or if a prescribed timing control signal at a prescribed time is received after any of said transmissions of said timing control order from said particular wireless terminal maintaining any link connection to said particular wireless terminal.

9. Apparatus for use in a wireless communications system including at least one base station and one or more wireless terminals for identifying whether a particular wireless terminal is reachable within a base station cell coverage area, the apparatus being in a base station and comprising:
    a transmitter for transmitting a timing control order in a timing control time slot assigned to said particular wireless terminal; and
    a monitor for monitoring received timing control signal time slots to determine whether a timing control signal has been received from said particular wireless terminal, reception of said timing control signal indicating that said particular wireless terminal is reachable in said base station cell coverage area;
    wherein one or more parameters associated with transmission of the timing control signal by the particular wireless terminal are specified in the timing control order.

10. The apparatus as defined in claim 9 wherein said timing control time slot is a paging time slot.

11. The apparatus as defined in claim 9 wherein said timing control order includes the identity of said particular wireless terminal being queried.

12. The apparatus as defined in claim 11 wherein said timing control order further includes a prescribed time at which and a prescribed timing control signal that said wireless terminal is to transmit.

13. The apparatus as defined in claim 9 wherein said particular wireless terminal and said base station know a priori a prescribed timing control signal and a prescribed time that said prescribed timing control signal is to be transmitted by said particular wireless terminal.

14. The apparatus as defined in claim 9 wherein said monitor further determines whether said timing control message has been received in a prescribed interval and, if not, said transmitter is controlled to terminate any link connection assigned to said particular wireless terminal.

15. The apparatus as defined in claim 14 wherein said transmitter is controlled to transmit a termination order to said particular wireless terminal.

16. The apparatus as defined in claim 14 wherein said transmitter is controlled to transmit said timing control order a prescribed number of times, and further including a receiver for receiving timing control time slots and if no timing control signal is received by said receiver after said prescribed number of transmissions, said transmitter is controlled to terminate any link connection to said particular wireless terminal or if a prescribed timing control signal at a prescribed time is received by said receiver after any of said transmissions of said timing control order from said particular wireless terminal maintaining any link connection to said particular wireless terminal.

17. Apparatus for use in a wireless communications system including at least one base station and one or more wireless terminals for identifying whether a particular wireless terminal is reachable within a base station cell coverage area, the apparatus being in a base station and comprising:
    means for transmitting a timing control order in a timing control time slot assigned to said particular wireless terminal; and
    means for monitoring received timing control signal time slots to determine whether a timing control signal has been received from said particular wireless terminal, reception of said timing control signal indicating that said particular wireless terminal is reachable in said base station cell coverage area;
    wherein one or more parameters associated with transmission of the timing control signal by the particular wireless terminal are specified in the timing control order.

\* \* \* \* \*